United States Patent
Iwasaki et al.

(10) Patent No.: US 9,996,288 B2
(45) Date of Patent: *Jun. 12, 2018

(54) TAPE-MANAGED PARTITION SUPPORT FOR EFFECTIVE WORKLOAD ALLOCATION AND SPACE MANAGEMENT

(71) Applicant: International Business Machines Corporation, Armonk, NY (US)

(72) Inventors: Norie Iwasaki, Fujisawa (JP); Katsuyoshi Katori, Kawasaki (JP); Koichi Masuda, Tokyo (JP); Joseph M. Swingler, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/431,464

(22) Filed: Feb. 13, 2017

(65) Prior Publication Data
US 2017/0153833 A1 Jun. 1, 2017

Related U.S. Application Data

(63) Continuation of application No. 14/452,406, filed on Aug. 5, 2014, now Pat. No. 9,606,930.

(51) Int. Cl.
*G06F 12/00* (2006.01)
*G06F 3/06* (2006.01)
*G06F 12/0871* (2016.01)

(52) U.S. Cl.
CPC .......... *G06F 3/0619* (2013.01); *G06F 3/0665* (2013.01); *G06F 3/0685* (2013.01);
(Continued)

(58) Field of Classification Search
CPC ...... G06F 3/061; G06F 3/0608; G06F 3/0665; G06F 3/0685; G06F 3/0688; G06F 12/0871; G06F 2212/604
See application file for complete search history.

(56) References Cited

U.S. PATENT DOCUMENTS 5,926,834 A * 7/1999 Carlson ............... G06F 12/0862
711/118
6,067,599 A 5/2000 Kishi et al.
(Continued)

FOREIGN PATENT DOCUMENTS

EP 0630022 A2 12/1994

OTHER PUBLICATIONS

The IBM Virtual Tape Server: Making tape controllers more autonomic IBM J. Res. & Dev. vol. 47 No. 4 Jul. 2003 G.T. Kishi pp. 459-468.*

(Continued)

*Primary Examiner* — David X Yi
*Assistant Examiner* — Tahilba Puche
(74) *Attorney, Agent, or Firm* — Zilka-Kotab, P.C.

(57) ABSTRACT

In one embodiment, a system includes a disk cache that includes a plurality of hard disk drives (HDDs) and a controller. The controller is configured to create one or more tape-managed partitions in the disk cache, each of the one or more tape-managed partitions being configured to store data that is subject to hierarchical storage management (HSM). The controller is also configured to create a premigration queue configured to service premigration data for all of the one or more tape-managed partitions. Moreover, the controller is configured to receive a premigration delay value for a first tape-managed partition, the premigration delay value defining a time period that elapses prior to queuing the premigration data for the first tape-managed partition to the premigration queue. The premigration delay value is based on a volume creation time. Other systems, methods, and computer program products are described in accordance with more embodiments.

20 Claims, 9 Drawing Sheets

(52) U.S. Cl.
CPC ........ *G06F 3/0689* (2013.01); *G06F 12/0871* (2013.01); *G06F 2212/217* (2013.01)

(56) References Cited

U.S. PATENT DOCUMENTS

| | | | |
|---|---|---|---|
| 7,085,895 | B2 | 8/2006 | Kishi |
| 7,360,030 | B1 | 4/2008 | Georgiev |
| 7,600,073 | B2 | 10/2009 | Kishi et al. |
| 7,689,759 | B2 | 3/2010 | Bello et al. |
| 7,774,094 | B2 | 8/2010 | Kishi et al. |
| 7,979,664 | B2 | 7/2011 | Carlson et al. |
| 8,078,798 | B2 | 12/2011 | Kishi |
| 8,140,788 | B2 | 3/2012 | Niranjan et al. |
| 8,234,464 | B2 | 7/2012 | Bish et al. |
| 8,442,957 | B2 | 5/2013 | Saake et al. |
| 8,572,319 | B2 * | 10/2013 | Kumagai ............ G06F 9/5072 711/114 |
| 8,667,238 | B2 | 3/2014 | Niranjan et al. |
| 9,606,930 | B2 | 3/2017 | Iwasaki et al. |
| 2013/0205082 | A1 * | 8/2013 | Murayama .......... G06F 12/0866 711/111 |
| 2013/0326159 | A1 | 12/2013 | Vijayan et al. |
| 2014/0078609 | A1 | 3/2014 | Ballard |
| 2014/0108720 | A1 | 4/2014 | Abe et al. |
| 2014/0330817 | A1 | 11/2014 | Eleftheriou et al. |
| 2016/0041758 | A1 | 2/2016 | Iwasaki et al. |

OTHER PUBLICATIONS

Iwasaki et al., U.S. Appl. No. 14/452,406, filed Aug. 5, 2014.
Non-Final Office Action from U.S. Appl. No. 14/452,406, dated Jan. 20, 2016.
Milligan et al., "Online Storage Virtualization: The key to managing the data explosion," Proceedings of the 35th Hawaii International Conference on System Sciences, 2002, pp. 1-9.
Johnson et al., "Performance Measurements of Tertiary Storage Devices," Proceedings of the 24th VLDB Conference, 1998, pp. 50-61.
Kishi, G.T., "The IBM Virtual Tape Server: Making tape controllers more autonomic," IBM Journal Research & Development, vol. 47, No. 4, Jul. 2003, pp. 459-469.
Final Office Action from U.S. Appl. No. 14/452,406, dated Jul. 22, 2016.
Notice of Allowance from U.S. Appl. No. 14/452,406, dated Nov. 17, 2016.
List of IBM Patents or Patent Applications Treated As Related.

* cited by examiner

TAPE-MANAGED PARTITION SUPPORT FOR EFFECTIVE WORKLOAD ALLOCATION AND SPACE MANAGEMENT

BACKGROUND

The present invention relates to data storage, and more particularly, to supporting tape-attached storage partitions using a storage controller.

In a data storage system, many different types of storage media may be utilized. Some of the more frequently used storage media include magnetic tape used with tape drives, hard disk drives (HDDs), and volatile or non-volatile random access memory (RAM). Typically, all the different storage media types when used in a converged solution are transparent to a user of the data storage system, as a virtualization engine masks the actual storage location and simply presents the data to the user utilizing a cache that stores data prior to being subsequently stored in other, more permanent locations. However, the virtualization engine then must efficiently manage where the data is stored across the various media types, in order to provide adequate system performance from a standpoint of cost, speed, accessibility, etc.

There are four different anticipated workload groups that will store data on the data storage system. "Disk cache only content" which includes content that only resides in cache within a specific cluster. Even when back-end magnetic tape is present, no copy will end up on the magnetic tape. Workloads that require quick, 100% cache-hit access and do not require an additional copy on magnetic tape fall into this anticipated workload group.

A next anticipated workload group is "primarily tape only content," which include workloads where the disk cache simply acts as a pass through cache allowing content to be immediately or near immediately migrated to magnetic tape. The disk cache is only used as a temporary repository for host and/or replication access. Workloads that are rarely accessed and likely do not expire quickly fall into this anticipated workload group.

Another anticipated workload group is "disk cache and tape content," which include workloads that are either too large to be entirely cache resident or need an extra layer of redundancy where a copy on magnetic tape is required. This copy on magnetic tape may exist in parallel with the copy in cache indefinitely. Workloads that require additional redundancy, need to be exported, or have an access pattern that provides a sufficient cache hit ratio when a portion exists in cache fall into this anticipated workload group.

Yet another anticipated workload group is "delayed to tape content," which includes workloads that are capable of being moved to magnetic tape, but a premigration to magnetic tape only occurs after satisfaction of some rule (such as time since creation). When the rule is time based, this allows magnetic tape to become an "archive" target where only data which has aged long enough before expiring ends up on the magnetic tape.

Given the above four anticipated workload groups for a converged solution and their use cases, it becomes evident that it is difficult to manage the movement of data from the cache to the magnetic tape in an effective manner, either from a space management perspective or throughput (with cache hit ratio) perspective, depending on each individual workload.

SUMMARY

In one embodiment, a system includes a disk cache that includes a plurality of hard disk drives (HDDs) and a controller. The controller is configured to create one or more tape-managed partitions in the disk cache, each of the one or more tape-managed partitions being configured to store data that is subject to hierarchical storage management (HSM). The controller is also configured to create a premigration queue configured to service premigration data for all of the one or more tape-managed partitions. Moreover, the controller is configured to receive a premigration delay value for a first tape-managed partition, the premigration delay value defining a time period that elapses prior to queuing the premigration data for the first tape-managed partition to the premigration queue. The premigration delay value is based on a volume creation time.

In another embodiment, a method for managing a disk cache includes creating one or more tape-managed partitions in a disk cache that includes a plurality of HDDs, each of the one or more tape-managed partitions being configured to store data that is subject to HSM. The method also includes creating a premigration queue configured to service premigration data for all of the one or more tape-managed partitions. Moreover, the method includes receiving a premigration delay value for a first tape-managed partition, the premigration delay value defining a time period that elapses prior to queuing the premigration data for the first tape-managed partition to the premigration queue. The premigration delay value is based on a volume creation time.

In yet another embodiment, a computer program product includes a computer readable storage medium having program code embodied therewith. The embodied program code is executable by a processor to cause the processor to create, by the processor, a cache resident partition in a disk cache that includes a plurality of HDDs, the cache resident partition being configured to store data thereto that is not subject to HSM. The embodied program code is further configured to cause the processor to manage, by the processor, the cache resident partition to have a size that is greater than a first minimum size and less than or equal to a total size of the disk cache. Also, the embodied program code is further configured to cause the processor to receive, by the processor, data to store to the disk cache and store, by the processor, the data to the cache resident partition at least initially. Moreover, the embodied program code is further configured to cause the processor to create, by the processor, one or more tape-managed partitions in the disk cache, each of the one or more tape-managed partitions being configured to store data that is subject to HSM. In addition, the embodied program code is further configured to cause the processor to manage, by the processor, the one or more tape-managed partitions to have a size that is greater than a second minimum size and less than or equal to a total size of the disk cache less a size of all other partitions combined.

Other aspects and embodiments of the present invention will become apparent from the following detailed description, which, when taken in conjunction with the drawings, illustrates by way of example the principles of the invention.

DETAILED DESCRIPTION

Figure 1:
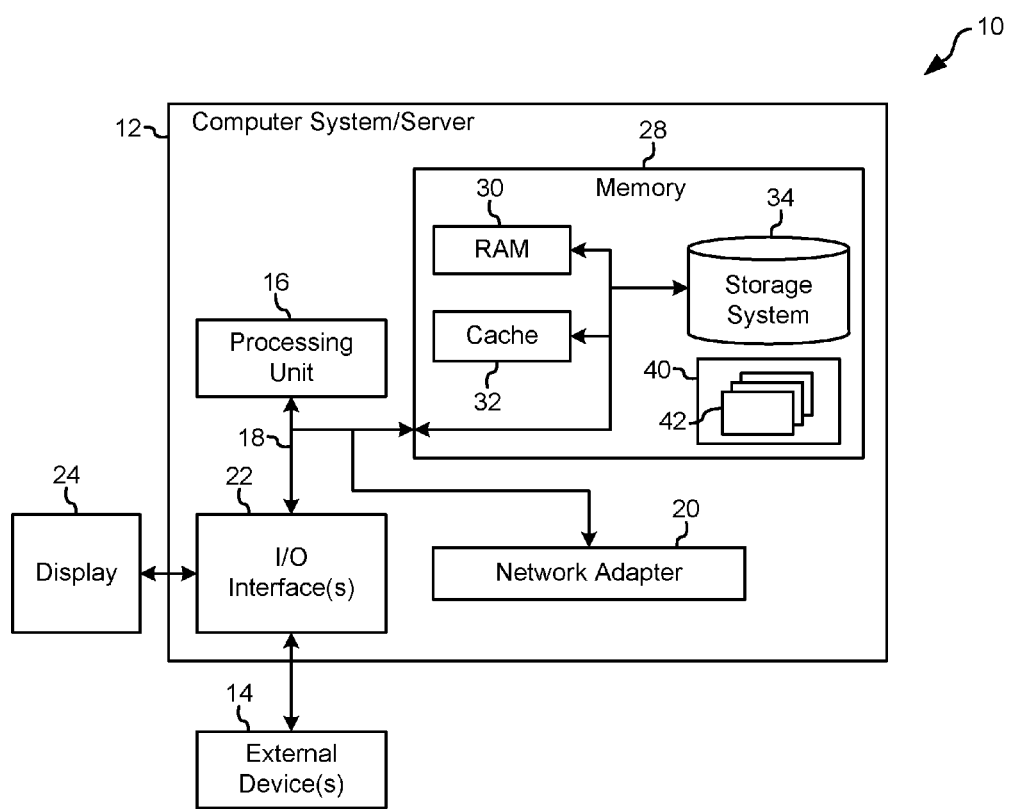
FIG. 1 illustrates a network storage system, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Especially with larger configured hard disk caches that have magnetic tape attached, it is inadequate that all content is treated the same way in a hierarchical storage management (HSM) system. All content is not created equally, as some characteristics of each workload (such as priority, use case-like archive, backup, online transaction, etc.) may be different and may elicit different treatment during storage and/or retrieval. To solve these concerns, an additional feature is provided to the virtualization engine—logically—managed partitions (or groups)—the ability to allocate workloads down into each logical partition or group. For content that is moved onto magnetic tape, a series of partitions may be defined. Any number of cache partitions may be created, only restricted by the resources available to the underlying hardware supporting the logical partitions.

Each partition has a customer configurable capacity associated therewith. The capacity or size assignment may be determined by how much content for each given partition will reside in disk cache. Each partition may be managed independently with respect to capacity using its own size restraints and maintain a segregated least recently used (LRU) algorithm taking only into account those volumes assigned to the partition. One partition is viewed as the resident only partition, with all other partitions being customer-sized tape managed partitions. The amount of capacity which remains within the disk cache after deducting the cumulative assigned capacities of the other partitions is the resulting size of the disk only residency partition.

In one general embodiment, a system includes a disk cache including a plurality of hard disk drives (HDDs) and a controller configured to create a cache resident partition in the disk cache, the cache resident partition being configured to store data thereto that is not subject to hierarchical storage management (HSM), manage the cache resident partition to have a size that is greater than a first minimum size and less than or equal to a total size of the disk cache, receive data to store to the disk cache, store the data to the cache resident partition at least initially, create one or more tape-managed partitions in the disk cache, each of the one or more tape-managed partitions being configured to store data that is subject to HSM, and manage the one or more tape-managed partitions to have a size that is greater than a second minimum size and less than or equal to a total size of the disk cache less a size of all other partitions combined.

In another general embodiment, a method for managing a disk cache includes creating a cache resident partition in a disk cache including a plurality of HDDs, the cache resident partition being configured to store data thereto that is not subject to HSM, managing the cache resident partition to have a size that is greater than a first minimum size and less than or equal to a total size of the disk cache, receiving data to store to the disk cache, storing the data to the cache resident partition at least initially, creating one or more tape-managed partitions in the disk cache, each of the one or more tape-managed partitions being configured to store data that is subject to HSM, managing the one or more tape-managed partitions to each have a size that is greater than a second minimum size and less than or equal to a total size of the disk cache less a size of all other partitions combined, controlling movement of data from each of the one or more tape-managed partitions to magnetic tape media on a per-partition basis, and controlling movement of data to each of the one or more tape-managed partitions on the per-partition basis.

In yet another general embodiment, a computer program product for managing a disk cache includes a computer readable storage medium having program code embodied therewith, the program code being readable and/or executable by a processor to cause the processor to create, by the processor, a cache resident partition in a disk cache including a plurality of HDDs, the cache resident partition being configured to store data thereto that is not subject to HSM, manage, by the processor, the cache resident partition to have a size that is greater than a first minimum size and less than or equal to a total size of the disk cache, receive, by the processor, data to store to the disk cache, store, by the processor, the data to the cache resident partition at least initially, create, by the processor, one or more tape-managed partitions in the disk cache, each of the one or more tape-managed partitions being configured to store data that is subject to HSM, manage, by the processor, the one or more tape-managed partitions to have a size that is greater than a second minimum size and less than or equal to a total size of the disk cache less a size of all other partitions combined, create, by the processor, a premigration queue configured to service premigration data for all of the one or more tape-managed partitions, manage, by the processor, the premigration queue using a premigration throttle level and a premigration priority threshold with the premigration priority threshold being less than the premigration throttle level which is less than a maximum size of the premigration queue, and progressively throttle, by the processor, addition of premigration data to the premigration queue once an amount of premigration data in the premigration queue exceeds the premigration throttle level to slow addition of premigration data to the premigration queue as the premigration queue becomes fuller.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic, software logic such as firmware, operating system, etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

Referring now to FIG. 1, a schematic of a network storage system 10 is shown according to one embodiment. This network storage system 10 is only one example of a suitable storage system and is not intended to suggest any limitation as to the scope of use or functionality of embodiments of the invention described herein. Regardless, network storage system 10 is capable of being implemented and/or performing any of the functionality set forth hereinabove.

In the network storage system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in the network storage system 10 is shown in the form of a general-purpose computing device. The components of computer system/server 12 may include, but are not limited to, one or more processors 16 or processing units, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media—not shown and typically called a "hard disk," which may be operated in a hard disk drive (HDD). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
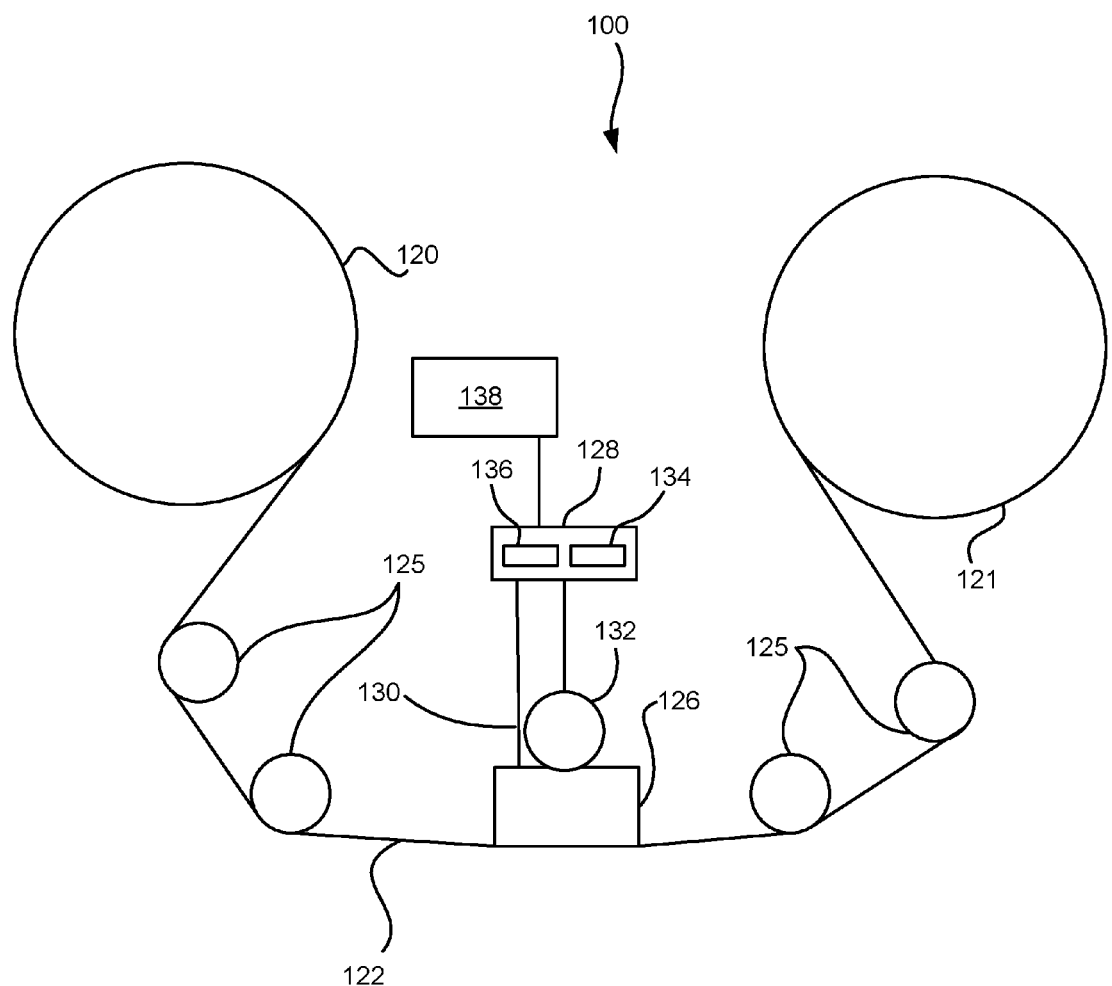
FIG. 2 illustrates a simplified tape drive of a tape-based data storage system, according to one embodiment.

FIG. 2 illustrates a simplified tape drive 100 of a tape-based data storage system, which may be employed according to various embodiments. While one specific implementation of a tape drive is shown in FIG. 2, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the tape drive 100. The tape drive, such as that illustrated in FIG. 2, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically comprises a servo channel 134 and data channel 136 which includes data flow processing. It controls reel motion (not shown in FIG. 2) and head functions, such as track following, writing, reading, etc. The cable 130 may include read/write circuits to transmit data to the head 126 to be recorded on the tape 122 and to receive data read by the head 126 from the tape 122. An actuator 132 moves the head 126 to a set of tracks on the tape 122 in order to perform a write or a read operation.

In one embodiment, the tape drive 100 may comprise a data buffer 138 which is accessible by the tape drive 100 and the controller 128.

An interface may also be provided for communication between the tape drive 100 and a host (integral or external) to send and receive the data and for controlling the operation of the tape drive 100 and communicating the status of the tape drive 100 to the host, as would be understood by one of skill in the art.

Figure 3:
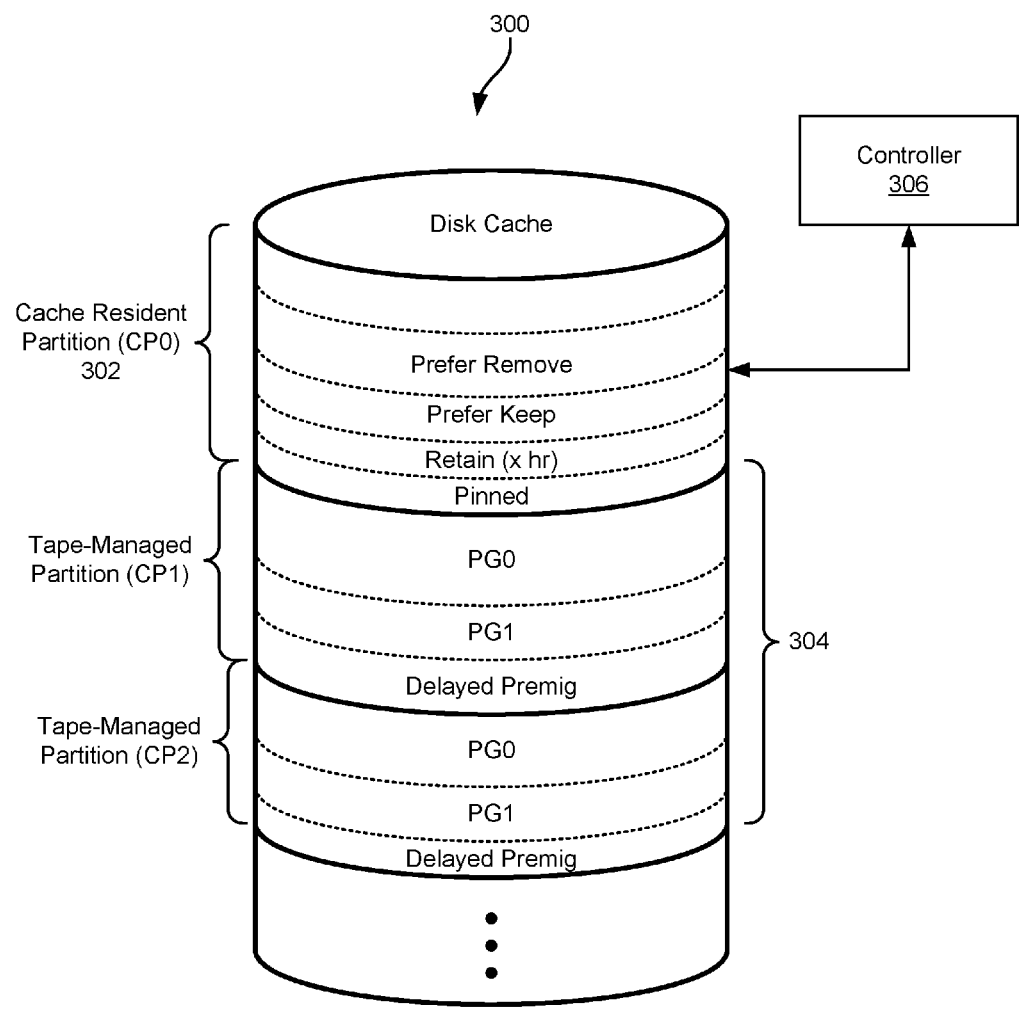
FIG. 3 shows a disk cache, according to one embodiment.

Now referring to FIG. 3, a disk cache 300 is shown according to one embodiment. The disk cache 300 may be used in a system configured to utilize HDDs along with magnetic tape in magnetic tape drives. The disk cache 300 comprises a plurality of HDDs working together under control of a controller 306, such as a disk cache controller, hierarchical storage management (HSM) controller, or some other suitable controller or group of controllers, and/or one or more processors, as would be understood by one of skill in the art.

In the disk cache 300, a cache resident partition 302, shown as cache partition 0 (CP0), is always present with a default minimum size and an automatically determined maximum size. The minimum size is less than a capacity of the disk cache 300 and may be defaulted to be 1 TB, 2 TB, 3 TB, 5 TB, or more, depending on a total capacity of the disk cache 300. The maximum size of the cache resident partition 302 (CP0) is dependent on the total capacity of the disk cache 300 (e.g., sum of all HDDs for the partition) and the size of any additionally configured tape-managed partitions 304 (e.g., sum of all HDDs for each partition), such as cache partition 1 (CP1), cache partition 2 (CP2), etc. When no tape-managed partitions 304 are present and/or enabled, the size of the cache resident partition 302 is equal to the total capacity of the disk cache 300. Essentially, the size of the cache resident partition 302 is calculated and is not configurable by a user or customer.

The cache resident partition 302 may be treated as a disk-only solution in one embodiment and all data stored therein may have automatic removal policy attributes associated therewith. Some exemplary removal policy attributes that may be applied to the data include: pinned, retained, prefer-to-keep (prefer keep), and prefer-to-remove (prefer remove), and each of these removal policy attributes may be applied to data stored in the cache resident partition 302. Furthermore, HSM functionality is not applied to the cache resident partition 302 in this embodiment.

The tape-managed partitions 304 (although only two such partitions are shown, CP1 and CP2, any number of tape-managed partitions 304 are possible, dependent on the total capacity of the disk cache 300 and the desired granularity of the disk cache 300 and/or a user's preference for processing workloads) are not required, and therefore, one or more tape-managed partitions 304 may optionally be present in the disk cache 300, as deemed useful to a customer, user, or administrator. When a tape-managed feature is enabled via the controller 306, a first tape-managed partition (CP1) is automatically installed with a default capacity, which may be set by a user or automatically configured based on total disk cache 300 capacity. In various embodiments, the default size of CP1 may be 1 TB, 2 TB, 3 TB, 5 TB, or more, as would be apparent to one of skill upon reading the present descriptions. After installation of CP1, a user, customer, and/or administrator may alter the size of CP1 to be any size less than the total capacity of the disk cache 300. In other embodiments, the user, customer, and/or administrator may create optional additional tape-managed partitions 304 (CP2, CP3, CP4, . . . , CPx). Furthermore, HSM functionality is applied to the data stored to the various tape-managed partitions 304 independently, being controlled separate from data stored to the other tape-managed partitions 304, in this embodiment.

In one embodiment, the size of each tape-managed partition 304 may occur in 1 TB increments, to simplify splitting of the disk cache 300, and thus the minimum size may be 1 TB or some multiple thereof, and the absolute maximum size is the maximum capacity of the disk cache 300 less 2 TB (the minimal size of the cache resident partition 302), in one approach. In other approaches, the size of each tape-managed partition 304 may be set in increments of 100 GB, 250 GB, 500 GB, or some other suitable increment.

In use, the maximum may further be limited by how much disk cache is already allocated to same-cluster tape-managed partitions 304 which are already defined in the disk cache 300.

In another embodiment, data that is stored to any of the tape-managed partitions 304 may have a preference group (PG) assignment associated therewith, such as PG0, PG1, etc. Data stored in virtual volumes may be managed by the PG assigned thereto. These PGs determine how soon volumes are migrated from the disk cache 300 following a copy of the data being created on backend physical magnetic tape. PG0 and PG1 may be used as known in the art, particularly in the context of the IBM TS7740 virtualization engine. A migration threshold applies to PG1, which is used to denote the last group of virtual volumes migrated from the disk cache 300.

The hierarchical storage management of such data is performed within the scope of the data in the same partition. That is to say, movement of the data up to the cache resident partition 302 and/or down to magnetic tape for each tape-managed partition 304 is controlled separate from the other tape-managed partitions 304. An additional mechanism to delay premigration itself is supported by allowing workloads to be initially treated as resident-only workloads and to only find themselves moving to tape when they have aged appropriately. The delay will be from creation, since last access, or according to some other time length, which is configured by the user, customer, and/or administrator, such as in the Storage Class construct.

In another embodiment, in order to prevent the delayed data from overrunning the tape-managed partitions 304 and pushing out all premigrated data, each tape-managed partition 304 may also have a defined maximum amount of delayed data stored therein. This threshold may be any suitable amount of data, such as 100 GB, 250 GB, 500 GB, 1 TB, etc., and multiples thereof. In another approach, the threshold may be up to the total capacity of the tape-managed partitions 304 less 500 GB. Once the delay period has expired, the data is treated as standard data, such as PG0 or PG1 data as defined by the user, customer, and/or administrator.

In another embodiment, in order to prevent the delayed content from overrunning the tape-managed partitions 304 and pushing out all premigrated data forcibly, maximum amount of delayed contents is introduced. In a case where the amount of delay premigration data within a partition exceeds its defined delay premigration threshold, those virtual volumes closest to meeting their delay requirements will be forced to expire early, meaning they are treated as if they have reached their delay requirement, and moved to their standard data state, such as a PG0 or PG1 state, and queued for premigration.

In another embodiment, for the tape-managed partitions 304, an over-committed state may be managed. An over-committed state may be realized when excessive movement of data occurs to a tape-managed partition that is unable to shrink in size. The over-committed size may be calculated by MAX(0, Used size−Allocated size), where the used size is the amount of data on the partition, and the allocated size is how much data is actually stored to the partition. For the cache resident partition 302, the over-committed state may be calculated as the sum of over-committed sizes from all of the tape-managed partitions 304.

According to another embodiment, at least one tape-managed partition 304 may be viewed as the primary tape partition. Initially, this partition is designated as CP1, but may be reconfigured at any time that more than one tape-managed partition 304 is present, such as by the user, customer, and/or administrator. In the event any HSM management of recalled data actively targets a tape-managed partition 304 that is not defined, the primary tape partition will be used as the target. Though tape-managed partitions 304 may be created and/or deleted, there must always exist a primary tape-managed partition and thus at least one tape-managed partition defined when the tape-attach feature is enabled.

According to one embodiment, one premigration queue will exist and is used to premigrate all data targeting all tape-managed partitions 304. In other embodiments, multiple premigration queues, one for each tape-managed partition 304 may be used to achieve a more balanced method of premigration processing runs over the various tape-managed partitions 304.

In either embodiment, as data becomes a candidate for premigration (such as due to aging, forced premigration, etc.) within a tape-managed partition 304, it is added to the premigration workload queue in the order it is processed. In one approach, no preference to source partition takes place; however, in other approaches, data from one or more particular tape-managed partitions 304 may have priority over data from some other tape-managed partitions 304. Once in the premigration queue, Controller operates to further align premigration tasks to common drives, media, and/or pools.

The premigration priority and premigration throttle thresholds may be defined through the Library Request (LI REQ) command in one implementation. The cumulative premigration data across all tape-managed partitions 304 may not exceed this threshold. According to one embodiment, the premigration priority will be activated when any of the following are true: 1) the amount of data stored within any tape-managed partition 304 is within a preset threshold (such as about 200 GB) of its currently configured size and only premigration delayed and/or queued premigration data exists; 2) the total amount of queued premigration data is within the preset threshold (e.g., 200 GB) of the total premigration capacity allowed (which may be an additional purchased amount when this feature is activated); and 3) the total amount of queued premigration data has reached the premigration priority threshold defined within the LI REQ.

The premigration host throttle will be activated, in one embodiment, when any of the following are true: 1) the amount of data within any tape-managed partition 304 is equal or exceeds its currently configured size and only premigration delayed or queued premigration data exists; 2) the total amount of queued premigration data is equal or exceeds the total premigration capacity allowed (purchased amount when this feature is activated); and 3) the total amount of queued premigration data has reached the premigration host throttle threshold defined within the LI REQ.

When amount of resident logical volumes that have not been queued in the premigration queue because of time-delayed premigration exceeds a threshold, the Controller makes the logical volumes expire earlier. The user, customer, and/or administrator may change the threshold via a user interface, a specific command, etc. An HSM function thread may periodically check the partition state and when it detects this condition, it forcibly moves the corresponding virtual tape volume to the premigration queue even when the expiration time has not been reached yet.

Given migration is a method to free up space within an HSM managed disk cache 300, the mechanism in which migration candidates are chosen must take into account partitions. As the Controller analyzes PG0 data, then Scratch data, and finally PG1 candidates for migration, it may favor those tape-managed partitions 304 which are near or above full and do so in a round-robin like fashion to prevent too much favoring of one tape-managed partition 304 over another. Also, from a space management efficiency view of point, the Controller may favor (and select) the migration candidates to skip those which are flashed (e.g., a Snapshot has been taken) given they do not actually free up space due to a frozen state caused by the Snapshot.

Partitions may be updated dynamically, so that changes to the sizes of the partitions, the creation of partitions, and the deletion of partitions may be handled. In addition, how movement of data from one partition to another will be handled may also be determined dynamically. All changes explained below are concurrent and will begin to take affect either immediately or within a suitable amount of time, such as 30 sec., one minute, etc., of the request or property change as explained below. Though changes to the configuration occur fairly quickly, movement of data or any resulting disk to tape movement will occur naturally and complete sometime after the setting is changed.

In another embodiment, when a volume's policy changes during a mount/demount sequence resulting in a different disk cache partition being targeted than where it currently exists, the following will be true:

1) Data moving from the cache resident partition (CP0) 302 to any of the tape-managed partitions 304 (CP1+) will change immediately at demount time and be treated as new data within the target partition. This may result in a target tape-managed partition 304 exceeding internal thresholds resulting in activity such as migration or early expiration delayed premigration. The Controller will not prevent the data from moving due to current data alone. Excessive movement to a partition that is unable to shrink in size results in that partition becoming over-committed. Any delays of premigration honor the original creation time of the volume. When an over-committed state results, the cluster will enter the over-committed state and exit the over-committed state once the background activity reduces the capacity of all over-committed partitions.

2) Content moving from one tape-managed partition 304 to another is effective immediately at demount time. Any changes in preference group and/or delay of premigration will take place at this time. Delays from creation will not be updated and honor the original creation time of the volume. A copy already existing on magnetic tape is retained so long as it targets the correct pool. In the event the pool changes, forced residency will be used for tape volume cache (TVC) clusters and the storage class not found (SCNF) mechanism will be used at peer locations. This is the condition where the HSM finds and moves (similar to a recall) data to disk cache so that it may apply a new or changed Storage Class properly after the user, administrator, etc., changes the Storage Class construct (e.g., PG0/1, etc.) and performs the mount/demount, and/or performs a Library request for a partition refresh to support the ability to mimic a mount/demount. The SCNF mechanism may be used to bring a new copy into the disk cache by peer replication, instead of recalling the copy in order to stage volumes to different magnetic tape pools or duplex to a set of pools when a duplex does not previously exist.

3) Data moving from a tape-managed partition (CP1+) 304 to the cache resident partition (CP0) 302 will occur immediately. When the volume is in disk cache, any copy on magnetic tape will be deleted at this time. When a copy only exists on magnetic tape, the magnetic tape and any duplex instance will remain on magnetic tape and only in the event of a recall to disk cache (targeting CP0) will the copy on magnetic tape then be removed. This retaining of data on magnetic tape for CP0 data implies CP0 may have a portion of its data on magnetic tape. Attempting to use methods such as SCNF or recalls to move all data to disk cache is beyond the autonomic design since too many use cases may exist. Thus, any need to move data fully into CP0 and remove all data on magnetic tape may be driven by the user, customer, and/or administrator using tools, such as PRESTAGE which will force recall of all data to disk cache.

4) Any data already migrated to magnetic tape that has its preference group or time delayed premigration properties change will not honor those changes unless a recall occurs as part of the mount/demount or when it occurs next through natural processing.

Another embodiment includes a new LI REQ command that is configured to support the ability to mimic a mount/demount within a distributed library and only refresh the properties associated with the Storage Class. The command may only support a single volume at a time, or may support more than one volume at a time, in various approaches. The HSM logic at the targeted distributed library will mimic the mount/demount changes as described above.

The operations configured to manipulate the various partitions of the disk cache 300 include partition creation, partition deletion, partition size increase, and partition size decrease. The partition creation operation causes an additional tape-managed partition 304 to be defined so long as enough free space exists within the cache resident partition 302 to support the minimum space requirements for an additional tape-managed partition 304. The requested capacity may not exceed the available free space, minus minimum space for the cache resident partition 302 (which may be defaulted to 2 TB or some other suitable size). If not enough free space exists within the cache resident partition 302, other partitions must be shrunk or data must be removed from the cache resident partition 302 through pre-removal, delete-expire processing, eject processing, and/or moving data to other tape-managed partitions 304. A partition may not be created when any peer tape-managed partitions 304 are over-committed in one embodiment.

The partition delete operation causes a partition to be deleted. However, the cache resident partition 302 may not be deleted, so the delete operation may only function on the tape-managed partitions 304, and one of these partitions may only be deleted when it includes zero or no data or content, including all data or content that has migrated to magnetic tape. All data may be deleted by the user, customer, and/or administrator, or moved to an alternate partition before the partition is able to be deleted. Any workload that targets the deleted partition (or any non-existent partition), with future workloads arriving from a host or through copies, will use default construct properties to store the data elsewhere.

The partition size increase operation functions to increase the size of a partition, and may only increase the size up to as large as the actual free space of the cache resident partition 302, less the minimum size of the cache resident partition 302. (which may be defaulted to 2 TB or some other suitable size). If not enough free space exists within the cache resident partition 302, the user, customer, and/or administrator may first shrink other tape-managed partitions 304 or remove data or content from the cache resident partition 302 through pre-removal, delete-expire processing, eject processing, and/or moving data or content to other tape-managed partitions 304. A size increase may occur when one or more partitions are over-committed. Since the partition to be increased in size may itself be over-committed, the partition's existing over-committed data may be reduced from the required available free space calculation against the cache resident partition 302.

The partition size decrease functions to reduce the size of a partition. A decrease in size will occur immediately after receiving the operation command, and likely will cause the partition to enter the over-committed state. If the deferred premigration threshold is higher than the new size minus the defined maximum amount of delayed data threshold, it will be automatically lowered to the new size minus the defined maximum amount of delayed data threshold, which may be 500 GB or some other suitable value. HSM functions automatically start to manage the excess through migration and early expiring of delayed premigration content. A size decrease may occur as long as one or more partitions are over-committed.

According to another embodiment, free space sizing of the cache resident partition 302 may be used. This rule or calculation may be used to define sizes as described below. With this, the cache state may be monitored and proper action may be taken to solve a detected unhealthy state (e.g., an over-committed state, etc.), leveraging the e.g., initially-configured, actually used, remaining (Free) space, and so on. Specifically, the cache resident partition 302 (CP0) has an expected capacity associated with it which is calculated as the maximum size of the disk cache 300 less the configured sizes of all tape-managed partitions 304 thereof. The configured size minus the active content targeting the cache resident partition 302 may be used to determine free space in one approach. But, with over-committing of tape-managed partitions 304 being expected, the actual free space may be less than expected given the tape-managed partitions 304 may be robbing the cache resident partition 302 of capacity.

Thus, all free space calculations should take into account over-committed data of other tape-managed partitions 304. The following equations and relationships may be used for such calculations. In these equations, CP0 is the cache resident partition 302, CP1+ are all of the tape-managed partitions 304 CP1 through CPx, and a snapshot has a general parallel file system (GPFS) physical size on magnetic tape.

1) CP0 Configured Size=Cache Size−Configured Size of tape-managed partitions (CP1+)
2) CP0 Active Size=Sum of all data currently assigned to CP0
3) CP0 Pending Free Space=Max (0, CP0 Configured Size−CP0 Active Size)
4) CP0 Actual Free Space=MIN(CP0 Pending Free Space, Max (0, Cache Size (MAX(CP1 Active Size, CP1 Configured Size)+ . . . MAX(CPx Active Size, Configured Size))−CP0 Active Size−GPFS Snapshot Physical Size))

Automatic removal will go into effect when the Actual Free Space value drops below the configured removal threshold. The cache resident partition 302 may enter a "Cache Warning" state and then a "Full State Alert" based on the Actual Free Space value. Also, partition creation and size increases may use the following equation to determine whether the operation is allowed or not: MIN(0, CP0 Actual Free Space−Predefined CP0 Min Size).

A Flash copy for DR testing operation may be used to create flash copies of data. When a flash snapshot (GPFS snapshot) occurs, all data within the disk cache 300 is retained and unable to be removed or freed from the disk cache 300. In other words, an already-full or near-full partition will not have any way to free up memory in the disk cache 300 through removal or migration. Though a volume may be removed (deleted) and/or migrated (deleted), the deletion of the actual raw data of the file does not occur given it must be retained within the flash snapshot.

Since GPFS provides no mechanism to free up snapshot retained space, there must be enough free space to accommodate an entire disaster recovery (DR) test prior to initiating a snapshot.

Therefore, in various embodiments, even when the tape-managed partitions 304 (e.g., CP1 through CPx, a.k.a. CP1+) are likely already full, the migration function does not directly release the space used by the migrated data. Also, given that the Controller manages all active data within a partition using managed lists, a deduction from the managed list will appear to have freed up the active capacity, thus accomplishing the goal of the migration. Therefore, to accelerate the free-up of active capacity, the Controller may favor (and select) the migration candidates, skipping those candidates which are flashed, given they do not actually free up space for reasons described above.

Token and volume snapshot concepts may be extended to the tape-managed partitions 304 for resident or premigrated data in one approach. Any data that is resident and/or premigrated within the tape-managed partitions 304 is a candidate for a flash snapshot reference during a DR test. Also, any changes through replication, host access, and/or through migration will not lose this cache resident and available instance. All delayed premigration content thus will also be available within the flash snapshot. Only data that was migrated prior to the snapshot will not have a snapshot version to access and thus will leverage the Live copy attributes of the DR testing (which requires a recall). The recall of Live copy data will be used when the premigration of the data being recalled was present in the partition prior to time zero of the snapshot.

A Live copy is a copy of data on a virtual tape. All virtual tape copies are a live copy. This is the live instance of a volume in a cluster. This means that it is a volume that may exist in the live read-write file system or the instance that may be modified by replication and/or production activity. A Flash copy is a snapshot of a live copy at time zero. The data in the Flash copy is fixed and does not change even when the original copy is modified. A Flash copy may not exist if a live volume was not present at time zero. In addition, a Flash copy does not imply consistency, as the live copy may have been inconsistent at time zero.

Automatic removal retention time may take on one of two characteristics: "relative to creation" or "relative to last access." With the "relative to creation" option, independent of how often data is accessed, it will expire its retention period once the configured time has passed since creation. In contrast, with the "relative to last access" option, each new access resets the time needed to expire data's retention period.

In another embodiment, the TVC selection may take into account the type of partition that data is in, e.g., the cache resident partition 302 or tape-managed partitions 304. This includes concepts of "residency and recall" and/or "premigration." Given that the managed behavior of the data is dependent on which partition it exists in or will exist in, TVC selection takes into account which partition the data is associated. For example, data targeting a tape-managed partition 304 will take into account the physical library state (e.g., out of scratch). Meanwhile, data targeting the cache resident partition 302 will take disk cache free space into account.

Figure 4:
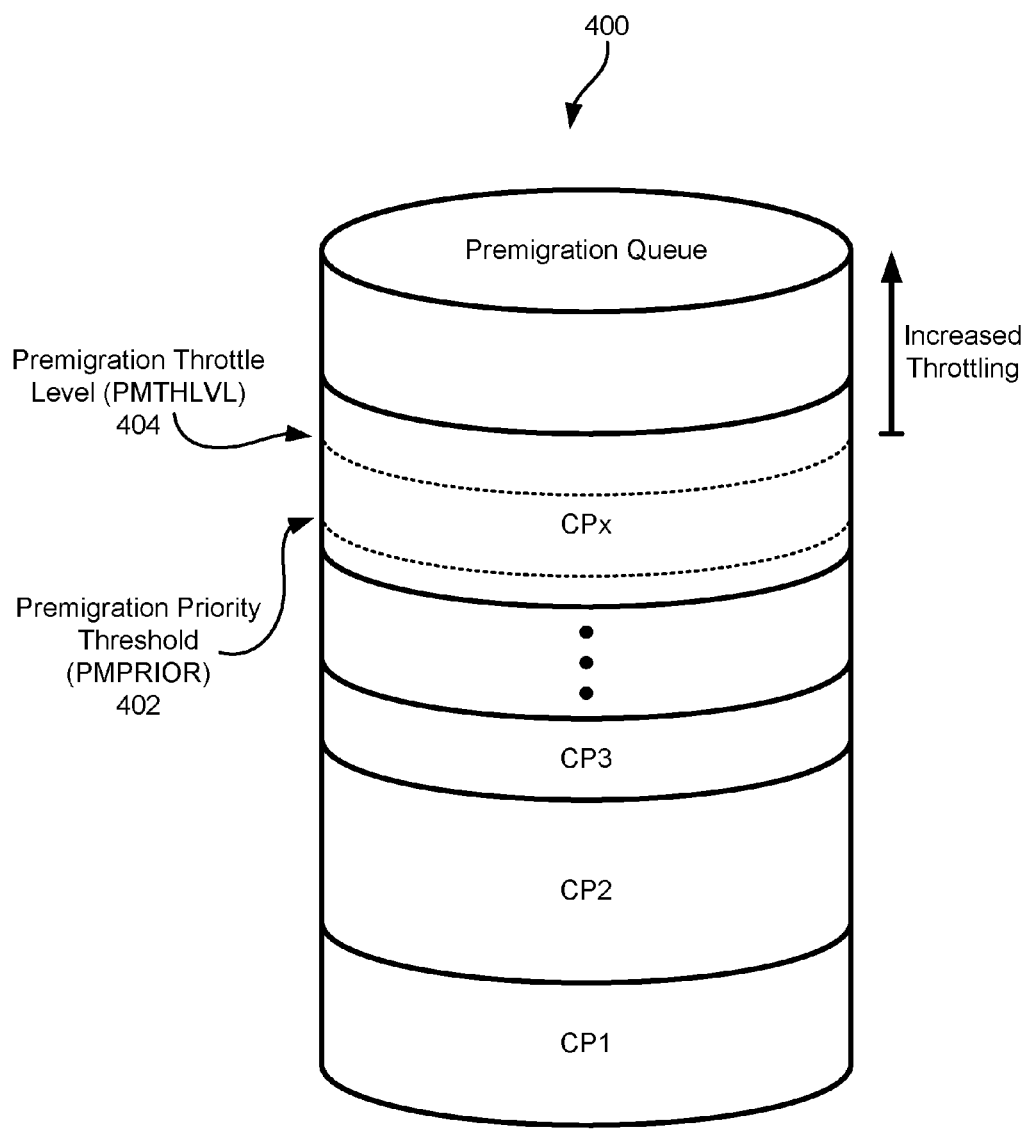
FIG. 4 shows a premigration queue for a disk cache, according to one embodiment.

With reference to FIG. 4, implementation of premigration processing with tape-managed partitions is described according to one embodiment. HSM function processing may have a single premigration queue 400, one Premigration Priority Threshold (PMPRIOR) 402, and one Premigration Throttle Level (PMTHLVL) 404, which are used to control the premigration priority. In this embodiment, PMPRIOR<PMTHLVL<Maximum Amount of Queued Premigration Data.

Time-delayed premigration may be used on the cluster when tape-managed functionality is installed and enabled. A "time-delayed premigration delay," denoted herein as 'X' (in hours), may be set which indicates premigration for the logical volume may be queued after the 'X' delay has elapsed.

The delay may be set from 0 to 65535 hours. 0 hours means time-delayed premigration is disabled and the Controller queues the logical volume to the premigration queue 400. A "time-delayed premigration reference" may also be set as either "volume creation time" or "volume last access time," as described previously. The "volume creation time" indicates the timestamp when the volume is created by a scratch mount (or written from beginning of tape) on TVC. The "volume last access time" indicates the timestamp when the volume data is accessed for the last (and most recent) time. The elapsed time before the logical volume is queued in the premigration queue 400 may be calculated, in one embodiment, by "NOW( )–TIMEREF( )," where NOW( ) is the current time, and TIMEREF( ) is the time-delayed premigration reference value in hours. In one embodiment, the "time-delayed premigration delay" and "time-delayed premigration reference" for each logical volume may be set through the Storage Class construct, or some other suitable technique known in the art.

The Premigration (also referred to as "Premig") Throttle Level, PMTHLVL 404, may be calculated based on a size of the premigration queue 400 and by how much the amount of data in the premigration queue 400 exceeds the PMTHLVL 404. Due to the overspill state, the amount of data that is possible to be written to any of the tape-managed partitions (CP1+) may be limited by the actual free space available in the cache resident partition (CP0), since this amount of actual free space may be less than the premigration queue 400 size.

Therefore, the Controller applies more throttling (by increasing a throttle value) so that CP0 is not filled by writing data to CP1. To calculate this throttle value, a variable referred to as "calculated premig queue" is defined. "Calculated premig queue" size is calculated from an amount of data in the premigration queue 400 and the actual free space in the cache resident partition (CP0). Since both the amount of data in the premigration queue 400 and the actual free space in CP0 may change frequently, the size of the "calculated premig queue" may be dynamically calculated periodically, such as during each periodic calculation of the throttle value.

Figure 5A:
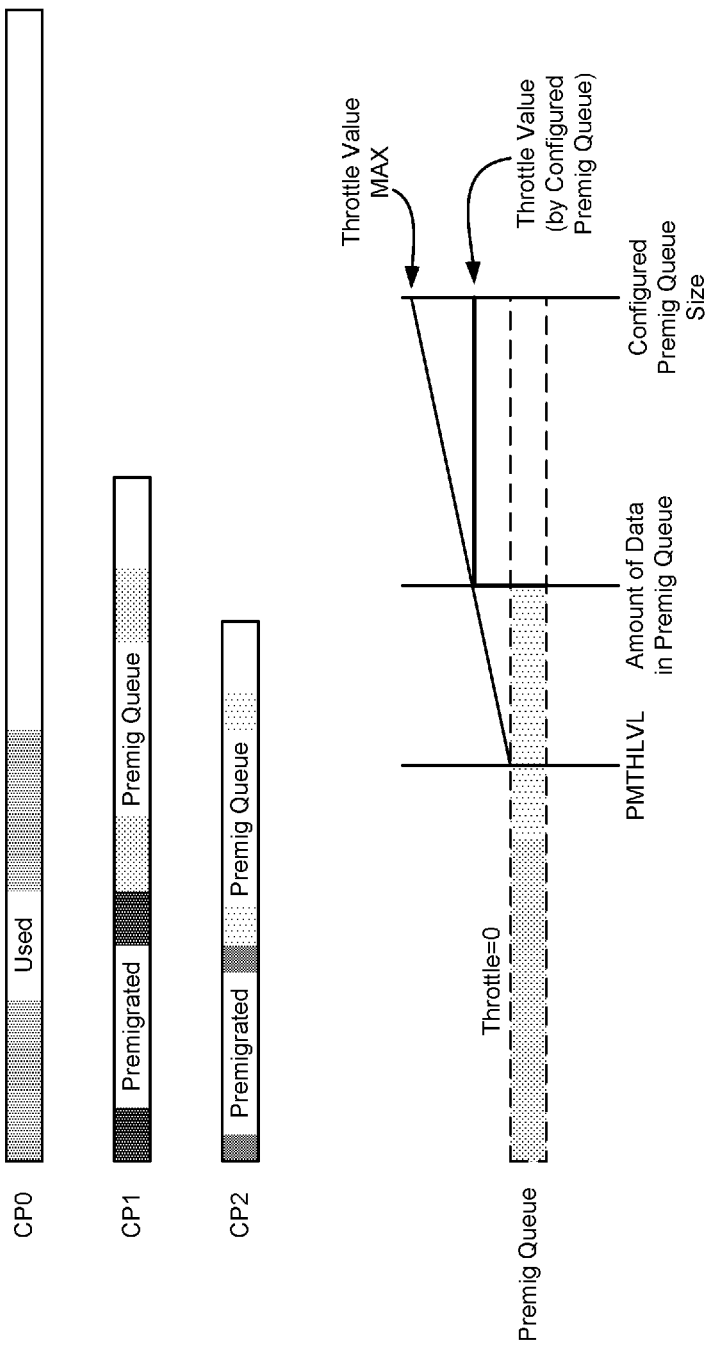
FIGS. 5A-5B show premigration throttling, according to one embodiment.
Figure 5B:
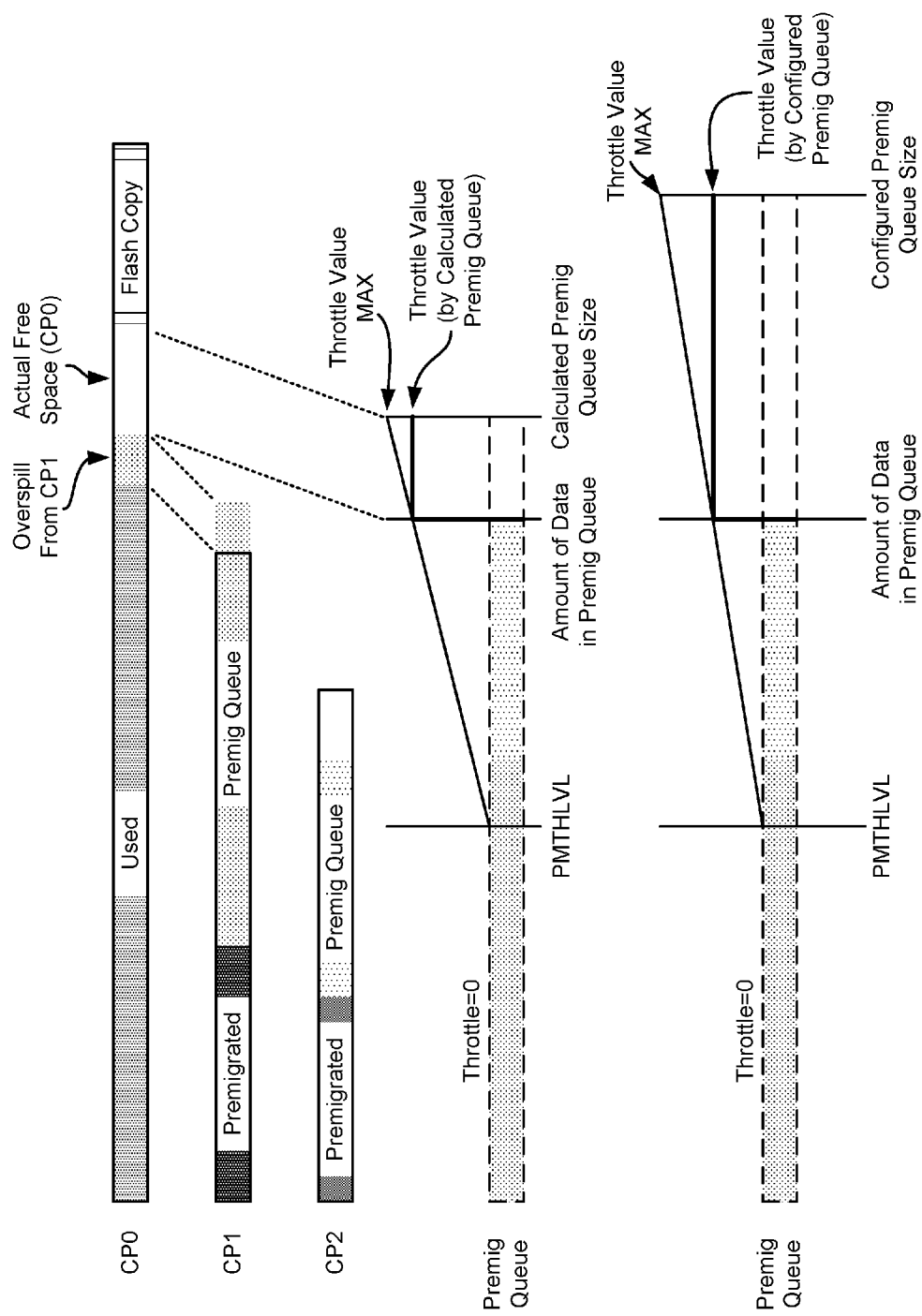

FIGS. 5A-5B illustrate how to control premigration throttling for the logical partitions. As shown, when CP1 is in the overspill state, the Controller uses the calculated premig queue size (C), which may be determined by adding the amount of data in the premigration queue (A) with the actual free space in CP0 (B), to calculate the throttle value by configured premigration queue (T). The throttle value by configured premigration queue (T) may then be calculated as the maximum throttle value (D) over a time period (such as 2 seconds, 5 seconds, etc.) multiplied by the amount of data in the premigration queue (A) minus the PMTHLVL divided by the calculated premig queue size (C) minus the PMTHLVL. The equation to calculate the throttle value by configured premigration queue, according to one embodiment, looks like this:

$$T = D \times (A - \text{PMTHLVL}) / (B - \text{PMTHLVL})$$

The Controller applies the greater of the throttle value by configured premigration queue and a throttle value by calculating the occupancy of an amount of actual logical volumes in the premigration queue. As shown in FIGS. 5A-5B, the throttle value by calculating the amount of actual logical volumes in the premigration queue, in this example, is less than the throttle value calculated based on the configured amount of logical volumes allowed in the premigration queue, and therefore the Controller applies the throttle value based on the configured premigration queue.

When assignment of the partition for storing one or more logical volumes changes from CPy to CP0, CP0 may become over-committed and it may also get pushed into the "out of the cache" state. In such a case, an auto-removal function would function for CP0 so that the size of used data fits within the CP0 allocation size, i.e., the removal function also automatically rectifies the "out of cache" state in one embodiment.

When assignment of the partition for storing one or more logical volumes is changed from CP0 to CPy (CPy denotes one of the CP1+ partitions) or between CPy and CPz (any two of the CP1+ partitions), the CPy may get pushed into the over-committed state. Auto migration for CPy would operate on CPy so that the size of used data fits within the CPy allocation size in one embodiment. When the size of the premigration queue is enough and a smaller CPy defined, hard writing from a host may make CPy enter the overspill state. When proper data is queued in the premigration queue, the Controller applies the premigration throttle value and a host write rate enters a premigration steady state with keeping out of the overspill state. After the host write is completed, Auto Migration for CPx operates so that the size of used data fits within the CPx allocation size.

Now referring to Table 1, the implementation of a defined threshold is described in one embodiment. In Table 1, E is defined as the configured size of CP0, such as 20 TB, or more or less.

TABLE 1

| STATE | Enter (Free Space) | Exit (Free Space) |
|---|---|---|
| Limited Free Cache Space | <MIN(3, E * 0.15) | >MIN(3.5, E * 0.175) |
| Out of Cache Resources | <MIN(1, E * 0.05) | >MIN(3.5, E * 0.175) |

When the configured size of CP0 is less than 20 TB, the configured size is multiplied by a factor (0.XX) and it exits "out of cache" state when 95% of the configured size of CP0 is filled up. The removal threshold may be changed, but the removal function only works when CP0 has more than 10 TB, in this exemplary set of data. These values are based on assumed values for the configured size of the CP0 (20 TB).

Figure 6:
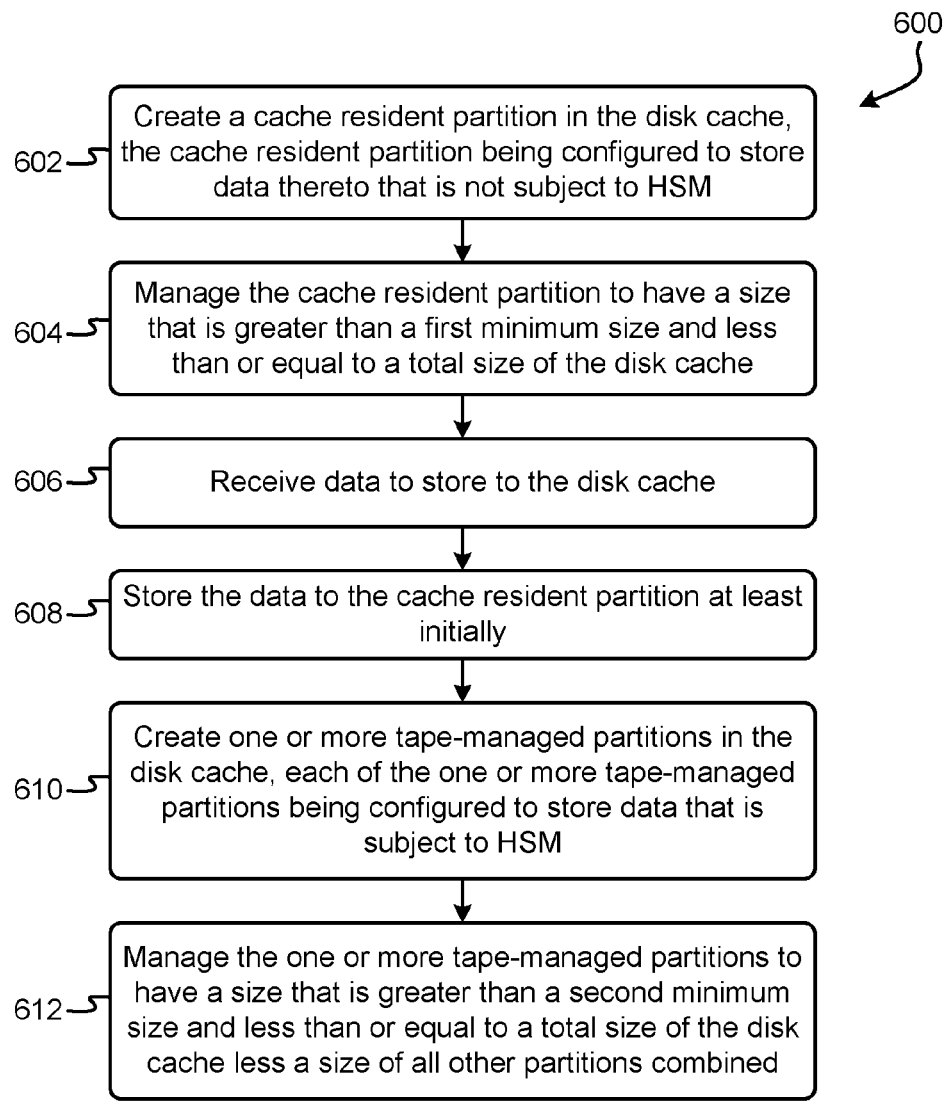
FIG. 6 shows a flowchart of a method, according to one embodiment.

Now referring to FIG. 6, a method 600 for managing a disk cache is shown according to one embodiment. The method 600 may be performed in accordance with the present invention in any of the environments depicted in FIGS. 1-5B, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various non-limiting embodiments, the method 600 may be partially or entirely performed by a tape drive, a hard disk drive, a HSM controller, a hierarchal storage manager, a storage library manager, a processor (such as a CPU, an ASIC, a FPGA, etc.) which may be embedded in and/or operate within a system, etc.

As shown in FIG. 6, method 600 may initiate with operation 602, where a cache resident partition is created in a disk cache comprising a plurality of HDDs. The cache resident partition is configured to store data thereto that is not subject to HSM.

In operation 604, the cache resident partition is managed to have a size that is greater than a first minimum size and less than or equal to a total size of the disk cache. The first minimum size may be 2 TB or some other suitable size based on a total size f the disk cache, such as 1%, 5%, 10%, 20%, 40%, 50%, 75%, 100%, etc., of the total capacity of the disk cache. As data is moved into or out of the partitions of the disk cache, the cache resident partition may have data moved in or out to ensure that its size is consistent with a configured size thereof.

In operation 606, data is received to store to the disk cache. This data may be provided by a host, server, or some other device, apparatus, or system capable of providing data to be stored to the disk cache.

In operation 608, the data is stored to the cache resident partition at least initially. In subsequent operations, the data may be moved to other partitions within the disk cache, or may be moved to magnetic tape media for long term storage.

In operation 610, one or more tape-managed partitions are created in the disk cache. Each of the one or more tape-managed partitions is configured to store data that is subject to HSM so that data in the one or more tape-managed partitions is expected to be offloaded and moved to attached magnetic tape media.

In operation 612, the one or more tape-managed partitions are managed to have a size that is greater than a second minimum size and less than or equal to a total size of the disk cache less a size of all other partitions combined. The second minimum size may be 1 TB, 3 TB, 5 TB, or more, as desired by a user or administrator, or automatically determined based on total capacity of the disk cache and the number of tape-managed partitions created.

In one embodiment, movement of data from each of the one or more tape-managed partitions to magnetic tape media may be controlled on a per-partition basis such that each partition's data is viewed as a separate source of data to be offloaded to the magnetic tape media, and an individual partition is not able to monopolize the offloading operations to the detriment of the overall disk cache operations. Furthermore, movement of data to each of the one or more tape-managed partitions (such as therebetween or from the cache resident partition) may be controlled on the per-partition basis.

In another embodiment, the data stored to the one or more tape-managed partitions may be allocated to the one or more tape-managed partitions based on a workload associated with the data such that each workload is assigned a different tape-managed partition. Of course, other separation schemes are possible using the tape-managed partitions of the disk cache, and any such schemes are possible using the techniques and descriptions of the disk cache provided herein, in various approaches.

In another embodiment, a premigration queue is created. The premigration queue is configured to service premigration data for all of the one or more tape-managed partitions, such that premigration activities are carried out across all of the tape-managed partitions, not just on a select few which monopolize the premigration activities. Further, the premigration queue is managed using a premigration throttle level and a premigration priority threshold with the premigration priority threshold being less than the premigration throttle level which is less than a maximum size of the premigration queue. In this way, addition of premigration data to the premigration queue may be throttled once an amount of premigration data in the premigration queue exceeds the premigration throttle level.

In yet another embodiment, when at least one of the one or more tape-managed partitions enters an over-committed state indicating that more data is stored to the at least one of the one or more tape-managed partitions than the at least one of the one or more tape-managed partitions is configured to store, space is allocated to the at least one over-committed tape-managed partition from the cache resident partition. In this way, the size of the cache resident partition is decreased by the same amount as the size of the over-committed tape-managed partition is increased.

According to another embodiment, the method 600 may include receiving a premigration delay value for a first tape-managed partition, the premigration delay value defining a time period that elapses prior to queuing the premigration data for first tape-managed partition to the premigration queue. also, method 600 may include queuing the premigration data for the first tape-managed partition in the premigration queue after the time period defined in the premigration delay value has elapsed.

In a further embodiment, the premigration data for the first tape-managed partition may be expired prior to the time period defined in the premigration delay value when an amount of data stored in the first tape-managed partition exceeds a delay premigration threshold, and the premigration data for the first tape-managed partition may be queued in the premigration queue prior to the time period having elapsed when the amount of data stored in the first tape-managed partition exceeds the delay premigration threshold.

In these embodiments, the premigration delay value may be based on at least one of: a volume creation time and a volume last accessed time.

Figure 7:
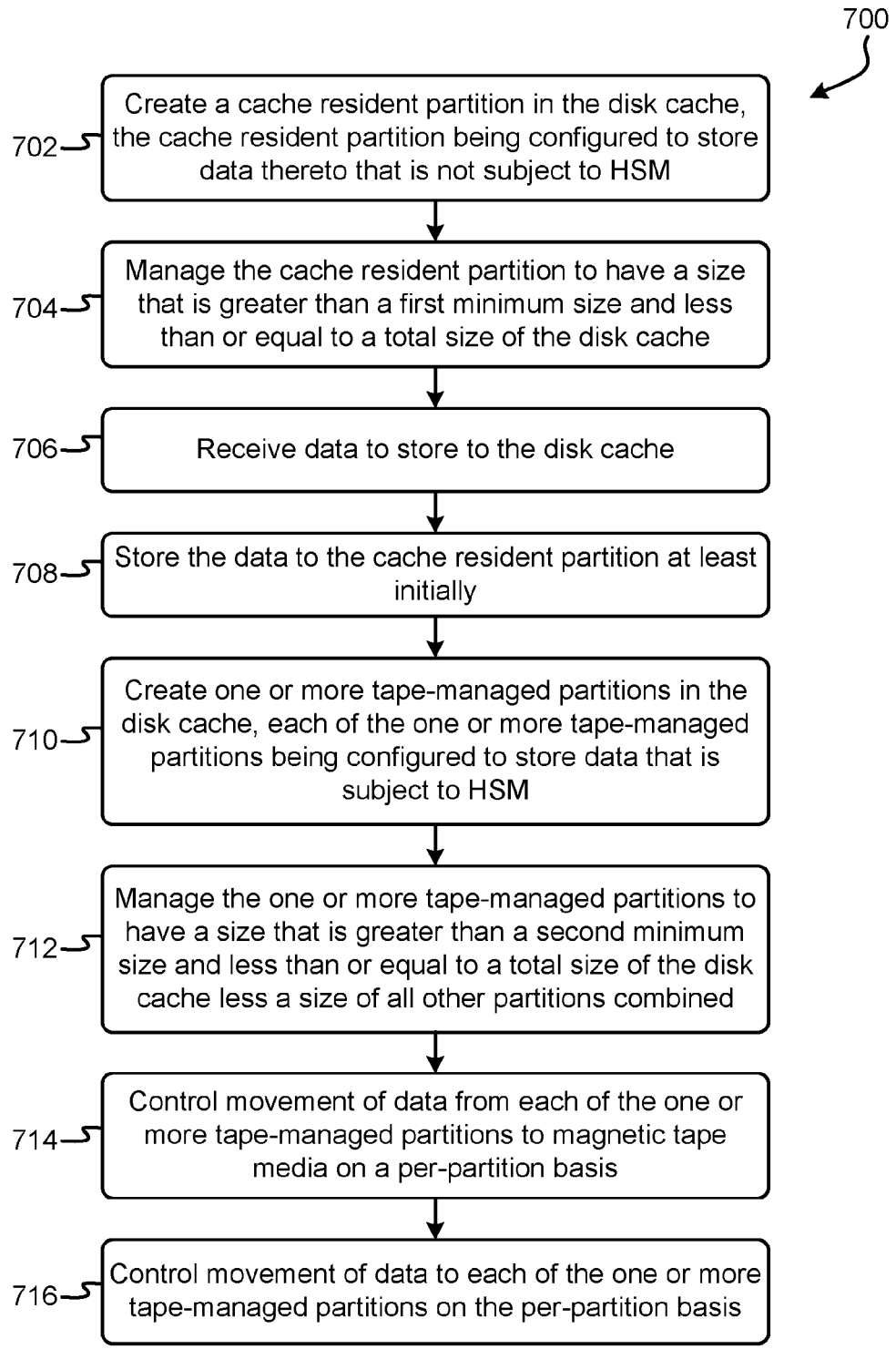
FIG. 7 shows a flowchart of a method, according to another embodiment.

Now referring to FIG. 7, a method 700 for managing a disk cache is shown according to one embodiment. The method 700 may be performed in accordance with the present invention in any of the environments depicted in FIGS. 1-5B, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various non-limiting embodiments, the method 700 may be partially or entirely performed by a tape drive, a hard disk drive, a HSM controller, a hierarchal storage manager, a storage library manager, a processor (such as a CPU, an ASIC, a FPGA, etc.) which may be embedded in and/or operate within a system, etc.

As shown in FIG. 7, method 700 may initiate with operation 702, where a cache resident partition is created in a disk cache comprising a plurality of HDDs. The cache resident partition is configured to store data thereto that is not subject to HSM.

In operation 704, the cache resident partition is managed to have a size that is greater than a first minimum size and less than or equal to a total size of the disk cache. The first minimum size may be 2 TB or some other suitable size based on a total size f the disk cache, such as 1%, 5%, 10%, 20%, 40%, 50%, 75%, 100%, etc., of the total capacity of the disk cache. As data is moved into or out of the partitions of the disk cache, the cache resident partition may have data moved in or out to ensure that its size is consistent with a configured size thereof.

In operation 706, data is received to store to the disk cache. this data may be provided by a host, server, or some other device, apparatus, or system capable of providing data to be stored to the disk cache.

In operation 708, the data is stored to the cache resident partition at least initially. In subsequent operations, the data may be moved to other partitions within the disk cache, or may be moved to magnetic tape media for long term storage.

In operation 710, one or more tape-managed partitions are created in the disk cache. Each of the one or more tape-managed partitions is configured to store data that is subject to HSM so that data in the one or more tape-managed partitions is expected to be offloaded and moved to attached magnetic tape media.

In operation 712, the one or more tape-managed partitions are managed to have a size that is greater than a second minimum size and less than or equal to a total size of the disk cache less a size of all other partitions combined. The second minimum size may be 1 TB, 3 TB, 5 TB, or more, as desired by a user or administrator, or automatically determined based on total capacity of the disk cache and the number of tape-managed partitions created.

In operation 714, movement of data from each of the one or more tape-managed partitions to magnetic tape media is controlled on a per-partition basis such that each partition's data is viewed as a separate source of data to be offloaded to the magnetic tape media, and an individual partition is not able to monopolize the offloading operations to the detriment of the overall disk cache operations.

In operation 716, movement of data to each of the one or more tape-managed partitions (such as therebetween or from the cache resident partition) is controlled on the per-partition basis. In this way, exchange of data from the cache resident partition to one of the tape-managed partitions does not monopolize the movement of data from the cache resident partition, and data may be more evenly moved across the various tape-managed partitions.

Any of the embodiments and approaches described in relation to method 600 in FIG. 6 may be implemented in the context of method 700 as shown in FIG. 7, in various non-limiting embodiments.

Figure 8:
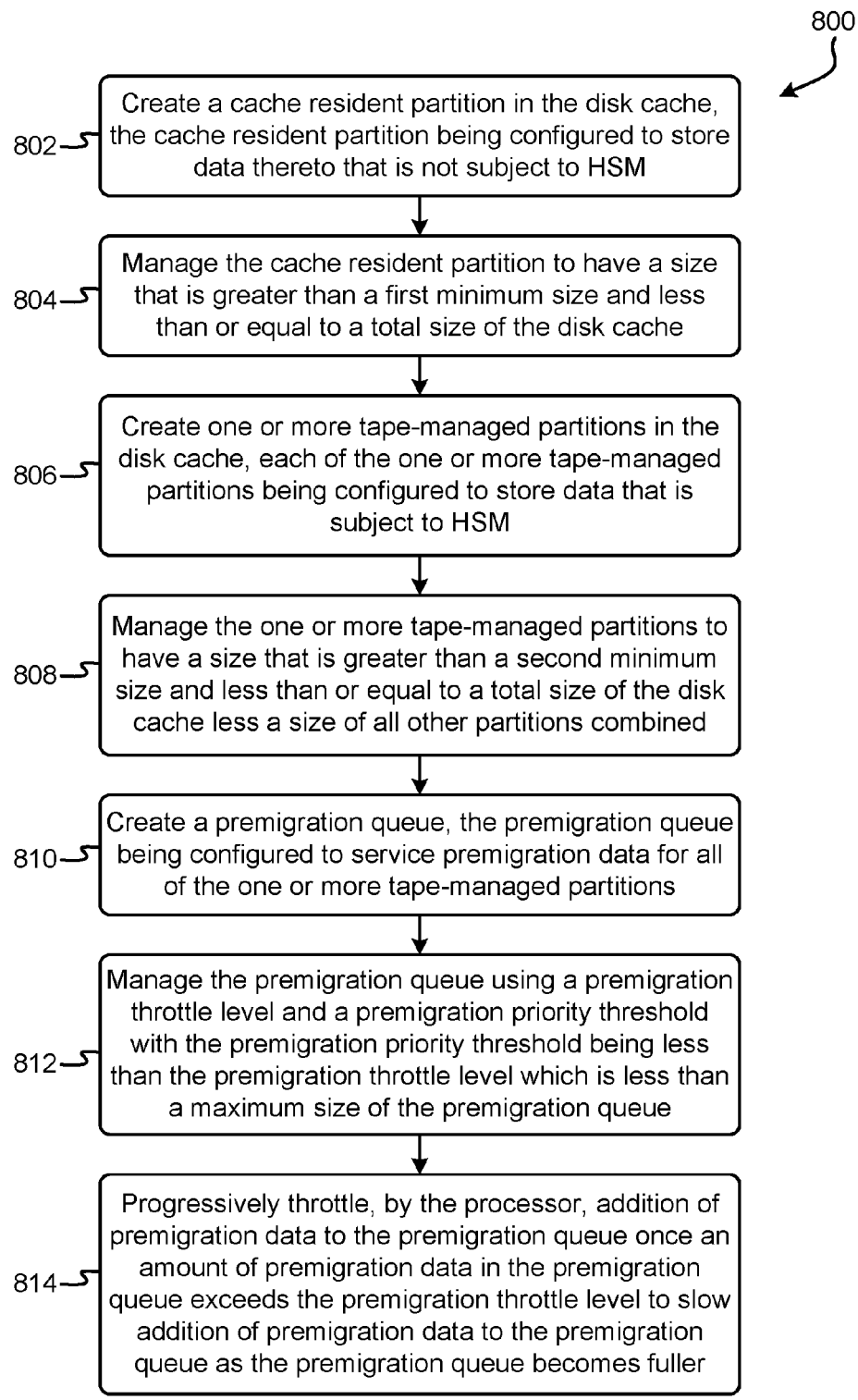
FIG. 8 shows a flowchart of a method, according to yet another embodiment.

Now referring to FIG. 8, a method 800 for managing a disk cache is shown according to one embodiment. The method 800 may be performed in accordance with the present invention in any of the environments depicted in FIGS. 1-5B, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various non-limiting embodiments, the method 800 may be partially or entirely performed by a tape drive, a hard disk drive, a HSM controller, a hierarchal storage manager, a storage library manager, a processor (such as a CPU, an ASIC, a FPGA, etc.) which may be embedded in and/or operate within a system, etc.

As shown in FIG. 8, method 800 may initiate with operation 802, where a cache resident partition is created in a disk cache comprising a plurality of HDDs. The cache resident partition is configured to store data thereto that is not subject to HSM.

In operation 804, the cache resident partition is managed to have a size that is greater than a first minimum size and less than or equal to a total size of the disk cache. The first minimum size may be 2 TB or some other suitable size based on a total size f the disk cache, such as 1%, 5%, 10%, 20%, 40%, 50%, 75%, 100%, etc., of the total capacity of the disk cache. As data is moved into or out of the partitions of the disk cache, the cache resident partition may have data moved in or out to ensure that its size is consistent with a configured size thereof.

In operation 806, one or more tape-managed partitions are created in the disk cache. Each of the one or more tape-managed partitions is configured to store data that is subject to HSM so that data in the one or more tape-managed partitions is expected to be offloaded and moved to attached magnetic tape media.

In operation 808, the one or more tape-managed partitions are managed to have a size that is greater than a second minimum size and less than or equal to a total size of the disk cache less a size of all other partitions combined. The second minimum size may be 1 TB, 3 TB, 5 TB, or more, as desired by a user or administrator, or automatically determined based on total capacity of the disk cache and the number of tape-managed partitions created.

In operation 810, a premigration queue is created. The premigration queue is configured to service premigration data for all of the one or more tape-managed partitions, such that premigration activities are carried out across all of the tape-managed partitions, not just on a select few which monopolize the premigration activities.

In operation 812, the premigration queue is managed using a premigration throttle level and a premigration priority threshold with the premigration priority threshold being less than the premigration throttle level which is less than a maximum size of the premigration queue. In this way, addition of premigration data to the premigration queue may be throttled once an amount of premigration data in the premigration queue exceeds the premigration throttle level.

In one embodiment, movement of data from each of the one or more tape-managed partitions to magnetic tape media may be controlled on a per-partition basis such that each partition's data is viewed as a separate source of data to be offloaded to the magnetic tape media, and an individual partition is not able to monopolize the offloading operations to the detriment of the overall disk cache operations. Furthermore, movement of data to each of the one or more tape-managed partitions (such as therebetween or from the cache resident partition) may be controlled on the per-partition basis.

In operation 814, addition of premigration data to the premigration queue is progressively throttled once an amount of premigration data in the premigration queue exceeds the premigration throttle level to slow addition of premigration data to the premigration queue as the premigration queue becomes fuller. This process effectively ensures that the premigration queue does not exceed its configured maximum size, and that data in the premigration queue is migrated out to the various magnetic tape media as needed to relieve the overspill of premigration data in the premigration queue.

Method 800 may also include receiving a premigration delay value for a first tape-managed partition, the premigration delay value defining a time period that elapses prior to queuing the premigration data for first tape-managed partition to the premigration queue, and queuing the premigration data for the first tape-managed partition in the premigration queue after the time period defined in the premigration delay value has elapsed.

Furthermore, the premigration data for the first tape-managed partition may be expired prior to the time period defined in the premigration delay value when an amount of data stored in the first tape-managed partition exceeds a delay premigration threshold, and the premigration data for the first tape-managed partition may be queued in the premigration queue prior to the time period having elapsed when the amount of data stored in the first tape-managed partition exceeds the delay premigration threshold.

Any of the embodiments and approaches described in relation to method 600 in FIG. 6 may be implemented in the context of method 800 as shown in FIG. 8, in various non-limiting embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
   a disk cache comprising a plurality of hard disk drives (HDDs); and
   a controller configured to:
      create one or more tape-managed partitions in the disk cache, each of the one or more tape-managed partitions being configured to store data that is subject to hierarchical storage management (HSM);
      create a premigration queue configured to service premigration data for all of the one or more tape-managed partitions; and
      receive a premigration delay value for a first tape-managed partition, the premigration delay value defining a time period that elapses prior to queuing the premigration data for the first tape-managed partition to the premigration queue, wherein the premigration delay value is based on a volume creation time.

2. The system as recited in claim 1, wherein the controller is further configured to:
   control movement of data from each of the one or more tape-managed partitions to magnetic tape media on a per-partition basis; and
   control movement of data to each of the one or more tape-managed partitions on the per-partition basis.

3. The system as recited in claim 2, wherein the data stored to the one or more tape-managed partitions are allocated to the one or more tape-managed partitions based on a workload associated with the data such that each workload is assigned a different tape-managed partition.

4. The system as recited in claim 1, wherein the controller is further configured to:
   manage the premigration queue using a premigration throttle level and a premigration priority threshold with the premigration priority threshold being less than the premigration throttle level which is less than a maximum size of the premigration queue; and
   throttle addition of data to the premigration queue once an amount of premigration data in the premigration queue exceeds the premigration throttle level.

5. The system as recited in claim 4, wherein, in response to at least one of the one or more tape-managed partitions entering an over-committed state indicating that more data is stored to the at least one of the one or more tape-managed partitions than the at least one of the one or more tape-managed partitions is configured to store, the controller is further configured to allocate space to the at least one over-committed tape-managed partition from a cache resident partition in the disk cache, the cache resident partition being configured to store data thereto that is not subject to HSM.

6. The system as recited in claim 4, wherein the controller is further configured to:
   queue the premigration data for the first tape-managed partition in the premigration queue after the time period defined in the premigration delay value has elapsed.

7. The system as recited in claim 6, wherein the controller is further configured to:
   expire the premigration data for the first tape-managed partition prior to the time period defined in the premigration delay value when an amount of data stored in the first tape-managed partition exceeds a delay premigration threshold; and
   queue the premigration data for the first tape-managed partition in the premigration queue prior to the time period having elapsed when the amount of data stored in the first tape-managed partition exceeds the delay premigration threshold.

8. The system as recited in claim 1, wherein the controller is further configured to apply removal policy attributes to data stored to the one or more tape-managed partitions, the removal policy attributes being selected from a group consisting of: pinned, retained for a predetermined period of time, prefer-to-keep, and prefer-to-remove.

9. A method for managing a disk cache, the method comprising:
   creating one or more tape-managed partitions in a disk cache that comprises a plurality of hard disk drives (HDDs), each of the one or more tape-managed partitions being configured to store data that is subject to hierarchical storage management (HSM);
   creating a premigration queue configured to service premigration data for all of the one or more tape-managed partitions; and
   receiving a premigration delay value for a first tape-managed partition, the premigration delay value defining a time period that elapses prior to queuing the premigration data for the first tape-managed partition to the premigration queue, wherein the premigration delay value is based on a volume creation time.

10. The method as recited in claim 9, further comprising:
    controlling movement of data from each of the one or more tape-managed partitions to magnetic tape media on a per-partition basis;
    controlling movement of data to each of the one or more tape-managed partitions on the per-partition basis; and
    allocating the data stored to the one or more tape-managed partitions to the one or more tape-managed partitions based on a workload associated with the data such that each workload is assigned a different tape-managed partition.

11. The method as recited in claim 9, further comprising:
    managing the premigration queue using a premigration throttle level and a premigration priority threshold with the premigration priority threshold being less than the premigration throttle level which is less than a maximum size of the premigration queue; and
    throttling addition of data to the premigration queue once an amount of premigration data in the premigration queue exceeds the premigration throttle level.

12. The method as recited in claim 11, further comprising allocating space to at least one over-committed tape-managed partition from a cache resident partition in the disk cache in response to at least one of the one or more tape-managed partitions entering an over-committed state indicating that more data is stored to the at least one of the one or more tape-managed partitions than the at least one of the one or more tape-managed partitions is configured to store, wherein the cache resident partition is configured to store data thereto that is not subject to HSM.

13. The method as recited in claim 11, further comprising:
    queue the premigration data for the first tape-managed partition in the premigration queue after the time period defined in the premigration delay value has elapsed.

14. The method as recited in claim 13, further comprising:
    expiring the premigration data for the first tape-managed partition prior to the time period defined in the premigration delay value when an amount of data stored in the first tape-managed partition exceeds a delay premigration threshold; and
    queuing the premigration data for the first tape-managed partition in the premigration queue prior to the time period having elapsed when the amount of data stored in the first tape-managed partition exceeds the delay premigration threshold.

15. The method as recited in claim 9, further comprising applying removal policy attributes to the data stored to the one or more tape-managed partitions, the removal policy attributes being selected from a group consisting of: pinned, retained for a predetermined period of time, prefer-to-keep, and prefer-to-remove.

16. A computer program product, the computer program product comprising a computer readable storage medium having program code embodied therewith, the embodied program code being executable by a processor to cause the processor to:
    create, by the processor, one or more tape-managed partitions in a disk cache that comprises a plurality of hard disk drives (HDDs), each of the one or more tape-managed partitions being configured to store data that is subject to hierarchical storage management (HSM);
    create, by the processor, a premigration queue configured to service premigration data for all of the one or more tape-managed partitions; and
    receive, by the processor, a premigration delay value for a first tape-managed partition, the premigration delay value defining a time period that elapses prior to queuing the premigration data for first tape-managed partition to the premigration queue, the premigration delay value being based on a volume creation time.

17. The computer program product as recited in claim 16, wherein the embodied program code is further executable by the processor to:

manage, by the processor, the premigration queue using a premigration throttle level and a premigration priority threshold with the premigration priority threshold being less than the premigration throttle level which is less than a maximum size of the premigration queue; and progressively throttle, by the processor, addition of premigration data to the premigration queue once an amount of premigration data in the premigration queue exceeds the premigration throttle level to slow addition of premigration data to the premigration queue as the premigration queue becomes fuller.

18. The computer program product as recited in claim 17, wherein the program code is further readable and/or executable by the processor to:

queue, by the processor, the premigration data for the first tape-managed partition in the premigration queue after the time period defined in the premigration delay value has elapsed.

19. The computer program product as recited in claim 16, wherein the embodied program code is further executable by the processor to:

control movement of data, by the processor, from each of the one or more tape-managed partitions to magnetic tape media on a per-partition basis;

control movement of data, by the processor, to each of the one or more tape-managed partitions on the per-partition basis; and allocate, by the processor, the data stored to the one or more tape-managed partitions based on a workload associated with the data such that each workload is assigned to a different tape-managed partition.

20. The computer program product as recited in claim 16, wherein the program code is further readable and/or executable by the processor to allocate space, by the processor, to at least one over-committed tape-managed partition from a cache resident partition in the disk cache in response to at least one of the one or more tape-managed partitions entering an over-committed state, wherein the over-committed state indicates that more data is stored to the at least one of the one or more tape-managed partitions than the at least one of the one or more tape-managed partitions is configured to store.

* * * * *